United States Patent [19]

Iwatschenko et al.

[11] Patent Number: 5,760,005
[45] Date of Patent: Jun. 2, 1998

[54] STABILIZED CALORIC NUTRIENT SOLUTION AND A MULTICOMPARTMENTAL SYSTEM OR MULTIPLE RECIPIENT FOR HUMAN PARENTERAL NOURISHING

[75] Inventors: Peter Iwatschenko, Neunkirchen/Brand; Franz F. Kachler, Wachenroth; Manfred Bugla, Forchheim, all of Germany

[73] Assignee: Pharmacia GmbH, Germany

[21] Appl. No.: 713,021

[22] Filed: Sep. 12, 1996

Related U.S. Application Data

[63] Continuation-in-part of Ser. No. 211,959, filed as PCT/EP/02416, Oct. 21, 1992, abandoned.

[30] Foreign Application Priority Data

Oct. 21, 1991 [DE] Germany ............................ 4134723.4

[51] Int. Cl.$^6$ .................................................. A61K 31/70
[52] U.S. Cl. ............................................................ 514/23
[58] Field of Search ........................................ 514/23, 25

[56] References Cited

U.S. PATENT DOCUMENTS 3,950,529  4/1976  Fischer et al. .

FOREIGN PATENT DOCUMENTS

| 0046167 | 2/1982 | European Pat. Off. . |
|---|---|---|
| 0101185 | 2/1984 | European Pat. Off. . |
| 3026368 | 2/1982 | Germany . |
| 3228127 | 2/1984 | Germany . |
| 3814806 | 11/1989 | Germany . |
| 82/03773 | 11/1982 | WIPO . |

OTHER PUBLICATIONS

Friedman, M., Molnar–Perl, I; Inhibition of Browning by Sulfur Amino Acids. 1. Heated Amino Acid–Glycose Systems; Journal of Agricultural and Food Chemistry, 1990, 38, pp. 1642–1647.

Seydel, Hildegund; Dissertation, 1938, pp. 57–58. No translation.

Schmidl, M., Massaro, S., Labuzza T.; Parenteral and Enteral Food Systems; Food Technology, 1988, pp. 77–87.

*Primary Examiner*—Elli Peselev
*Attorney, Agent, or Firm*—St. Onge Steward Johnston & Reens LLC

[57] ABSTRACT

The invention relates to a caloric nutrient solution for human parenteral nourishing, containing at least one reducing sugar and a stabilizer for the sugar or sugars and, if desired, further energizers, the solution being free of amino acids and their salts and containing N-acetyl cysteine as stabilizer. The invention also relates to a multicompartmental system or multiple recipient for human parenteral nourishing, comprising at least one compartment or recipient which contains amino acids and one compartment or recipient which contains the stabilized nutrient solution. Mixing of the two solutions yields color-stable, permanent mixed solutions.

13 Claims, No Drawings

STABILIZED CALORIC NUTRIENT SOLUTION AND A MULTICOMPARTMENTAL SYSTEM OR MULTIPLE RECIPIENT FOR HUMAN PARENTERAL NOURISHING

RELATED APPLICATION DATA

This application is a continuation-in-part application of U.S. Ser. No. 08/211,959, filed Apr. 21, 1994, now abandoned, which claimed benefit of PCT priority application number PCT/EP/02416, filed Oct. 21, 1992, and Ger. Pat. Ap. No. P4134723.4 filed Oct. 21, 1991.

TECHNICAL FIELD

The invention relates to a caloric nutrient solution for human parenteral nourishing, e.g. intravenous nutrition which is free of amino acids and their salts and contains at least one reducing sugar and a stabilizer for the sugar or sugars and, if desired, further conventional energizers.

The invention also relates to a multicompartmental system for human parenteral nourishing, comprising a compartment which contains an amino acid solution and a compartment which contains a nutrient solution.

BACKGROUND OF THE INVENTION

It is known in general to apply solutions of amino acids and/or peptides in combination with reducing sugars, such as particularly glucose or fructose plus fats, electrolytes, and vitamins, if desired, in the parenteral nutrition of human beings.

A wide variety of preparations and finished drugs also have been formulated for therapeutic and/or nutritious purposes to be administered to patients suffering from liver or kidney diseases. In this context the amino acid pattern was given special attention. It is know, for instance, from DE-OS 25 56 100 to administer the individual amino acids, both essential and non-essential ones, at certain relative ratios in the form of certain amino acid patterns. In this case the amino acids usually are employed as free amino acids. Yet it is likewise known to use amino acid salts or amino acid derivatives. For example, it is known to use cysteine in the form of the hydrochloride or the N-acetyl derivative.

Furthermore, it is known in general to provide amino acid solutions, on the one hand, and solutions containing reducing sugars, on the other hand, and, if desired, further solutions comprising substances needed for human nourishment, such as fats, peptides, electrolytes, and vitamins packed in a multicompartmental system or multiple recipient, at the required quantitative ratios, as a ready drug for parenteral and intravenous human nourishing. The individual solutions are mixed prior to being administered to the patient. As a rule, the known multicompartmental system or multiple recipients are marketed in thermally sterilized form. Separate compartments or recipients taking up the amino acids, on the one hand, and the reducing sugars on the other hand, proved to be necessary in order to avoid undesirable reactions between the reducing sugars and the amino acids.

Moreover, it is generally known that highly reactive derivatives result from the thermal sterilization of solutions of reducing sugars, such as glucose and fructose.

And it is likewise known that the chemical stability of amino acid solutions suffers from thermal stress during the heat sterilization. Certain amino acids, furthermore, are susceptible of oxidizing, and their reaction products are liable to react with non-oxidized amino acids.

As stated in DE-OS 38 14 806, quantities of less than 0.5% of cysteine, N-acetyl cysteine, or their salts and esters added to amino acid solutions as anti-oxidants are intended to prevent decomposition reactions which are caused by residual oxygen or by oxygen which has entered by diffusion during storage. It is thus recommended in DE-OS 38 14 806 to add N-acetyl cysteine as an anti-oxidant to amino acid solutions.

Surprisingly, however, it has now been found that, contrary to the teaching of DE-OS 38 14 806, when oxygen enters during storage to amino acid solutions containing N-acetyl cysteine, they become much more color unstable than amino acid solutions not containing N-acetyl cysteine. Just as surprisingly it was found, on the other hand, that amino acid solutions free of N-acetyl cysteine, when mixed with solutions of reducing sugars, within hours display discoloration as a characteristic of rapidly ongoing chemical reactions.

SUMMARY OF THE INVENTION

It is the object of the invention to provide solutions suitable for human parenteral and intravenous nourishment containing amino acid solutions and reducing sugars packed in a multicompartmental system or multiple recipient and characterized by optimum storage firmness and color stability.

This object is met, in accordance with the invention, in that the N-acetyl cysteine is no longer used, as before, as a component of the amino acid solution but instead is added to the solution which contains the reducing sugar or sugars.

The subject matter of the invention thus is a caloric nutrient solution and a multicompartmental system as indicated in the claims. Removing the N-acetyl cysteine from the amino acid solution which may contain peptides, too, if desired, permits the preparation of color stable solutions which have a correspondingly long shelf life. At the same time, the addition of N-acetyl cysteine to the solution of the reducing sugar, such as glucose or fructose, effectively suppresses the formation of the highly reactive derivatives which normally are obtained from the decomposition of sugar. Consequently, when admixing the amino acid solution to the sugar solution, none of these derivatives are left which might enter into color forming reactions with amino acids.

DETAILED DESCRIPTION OF THE INVENTION

The invention thus is based on the general finding that N-acetyl cysteine is excellently suited for stabilizing solutions of reducing sugars which are free of amino acids but do contain not only one or more reducing sugars but also other energizers that are customary for intravenous and parenteral nourishment of human beings, such as polyols, like xylite and/or disaccharides, like maltose and/or fats and the like.

The nutrient solution according to the invention advantageously may contain from about 0.01 to about 50.0, preferably from about 0.05 to about 5.0 g/l N-acetyl cysteine. Any reducing sugars, especially pentoses and hexoses which are suitable for parenteral and intravenous human nourishment, may be used as reducing sugars. Preferably, glucose and fructose are used. The solution may comprise one sugar or a mixture of different sugars.

The amino acid solutions may comprise one of the customary known amino acid patterns which are suitable for human parenteral and intravenous nourishment. Typical patterns are known, for instance, from DE-OS 25 56 100.

Apart from a compartment or recipient for the sugar solution and a compartment or recipient for the amino acid solution, the multicompartmental system or multiple recipient may comprise further compartments or recipients, if desired, which are filled with other substances that are required or favorable for the nutrition of humans, such as fats, peptides, electrolytes and/or vitamins. The multicompartmental system or multiple recipients are of conventional known design. Accordingly, they advantageously consist of liquid-proof plastic materials. However, the multiple recipients also may be made of other materials, such as glass.

EXAMPLES

The following are presented to further illustrate and explain the present invention and should not be taken as limiting in any regard. Unless otherwise mentioned, all parts and percentages are by weight, and are based on the weight of the particularly processing step described.

Example 1

The compartments of a conventional plastic dual compartment system were filled as follows:

(1) one compartment with an amino acid solution, composed as follows:

|  | g/l |
| --- | --- |
| L-isoleucine | 4.20 |
| L-leucine | 5.70 |
| L-glutamic acid L-lysine salt (1:1) 2 $H_2O$ | 15.15 |
| L-methionine | 5.50 |
| L-phenylalanine | 4.10 |
| L-threonine | 5.40 |
| L-tryptophan | 2.10 |
| L-valine | 4.70 |
| L-arginine | 14.00 |
| L-histidine | 3.50 |
| L-alanine | 26.00 |
| L-(+)-glutamic acid | 12.36 |
| amino acetic acid | 15.60 |
| L-proline | 14.10 |
| L-serine | 14.10 |
| L-acetyl-L-tyrosine | 2.25 |
| glycerol-1(2)-dihydrogen phosphate mixture of the disodium salts (30/70-G/G) 5 $H_2O$ | 6.12 |
| sodium chloride | 2.34 |
| potassium chloride | 1.49 |
| potassium-L-hydrogen glutamate $H_2O$ | 4.07 |
| calcium chloride 2 $H_2O$ | 0.44 |
| magnesium chloride 6 $H_2O$ | 1.02 |
| zinc chloride | 0.0082 |
| for injection purposes filled with water up to | 1000 ml |
| (2) the second compartment with a 40% glucose solution to which 0.7 g/l N-acetyl cysteine had been added. | |

After the solutions had been filled in and the compartments closed, the compartmental system was subjected to a pharmacopeia-conform heat sterilization at 121° C. The sterilization period was 15 minutes.

Following that, the two solutions were mixed at a volume ratio of 1:1. No discoloration occurred as much as 24 hours after the mixing.

Comparative Example A

The method described in Example 1 was repeated in the same vessel with the exception, however, that the addition of N-acetyl cysteine was dispensed with which, in the example, had been added to the sugar solution. In this case, manifest discoloration, as an indication of quickly ongoing chemical reactions, could be observed 24 hours after the mixing of the two solutions.

Comparative Example B

In Friedman, M., and Molnar-Perl, *J. Agric. Food Chem.* 38: 1642-1647 (1990), a solution for parenteral nutrition containing both amino acids and carbohydrates is disclosed. In order to reduce this concept to practice, Friedman and Molnar-Perl further suggest to utilize N-acetyl cysteine in an amount such that the ratio glucose to N-acetyl cysteine is about 1:1. Thus, a typical solution following the teaching of the paper contains about 36 g/l glucose and 32.6 g/l N-acetyl cysteine. This approach has two drawbacks in comparison to the present invention (cf. Example 1). First of all, upon heat sterilization of the Friedman/Molnar-Perl solution at 120° C. for 15 minutes in a comparative test, a significant amount of hydrogen sulfide is produced (more than 4 mg/l). Such production of $H_2S$ is detrimental to the envisaged use in parenteral nutrition. The second drawback relates to the extremely high concentration of N-acetyl cysteine which on the one hand has no particular (apart from preventing browning) in a parenteral solution, and thus, the overall balance of amino acids may be jeopardized by the presence of N-acetyl cysteine, and on the other hand, upon storage further amounts of $H_2S$ may be produced.

In an additional experiment, though contrary to the explicit teaching of the paper, low concentrations of N-acetyl cysteine were employed in one solution. This was a comparison to test whether the addition of N-acetyl cysteine in the "two solution" concept of the present invention as opposed to the "one solution" concept of Friedman and Molnar-Perl brings about a surprising effect. A solution containing amino acids in the amounts as set forth in Example 1 and 400 g/l glucose can not be effectively stabilized by a concentration of 0.7 g/l N-acetyl cysteine. When such solution is heat sterilized as contemplated by Friedman and Molnar-Perl, a browning reaction is observed in a relatively short period of time. Again, as already evidenced in Example 1 above, the same amount of N-acetyl cysteine is effective in the "two solution" concept of the present invention. This finding is quite surprising.

Moreover, it was surprisingly found that adding N-acetyl cysteine in a "two solution" concept to the separate amino acid solution does not effectively allow the inhibition of browning. As already discussed above, it was detected that a solution containing amino acids and N-acetyl cysteine becomes colored again within a relatively short period of time. Thus, solutions of the invention exhibit advantages over that described by Friedman and Molnar-Perl.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are intended to cover the claimed components and steps in any sequence which is effective to meet the objectives there intended, unless the context specifically indicates the contrary.

We claim:

1. A caloric nutrient solution for human parenteral nourishing containing at least one reducing sugar and optionally further energizers or electrolytes with the proviso that said solution is absent of amino acids except N-acetyl cysteine, wherein said solution further comprises from about 0.05 to about 5.0 g/l N-acetyl cysteine as stabilizer to suppress the formation of highly reactive derivatives of said reducing sugar or sugars which normally are obtained from the decomposition of sugar thereby preventing a discoloration reaction which normally occurs shortly after a solution of reducing sugars is admixed to a solution of amino acids.

2. A nutrient solution according to claim 1 which comprises glucose, fructose, or mixtures thereof as reducing sugar.

3. A nutrient solution according to claim 1 which comprises from about 2.5 to 70% of the reducing sugar or sugars.

4. A nutrient solution according to claim 1 comprising less than or equal to about 1 g/l N-acetyl cysteine.

5. A multicompartmental system or multiple recipient for human parenteral nourishing, comprising a compartment or recipient which contains an amino acid and a compartment or recipient comprising the nutrient solution according to claim 1.

6. A system or recipient according to claim 5 which comprises glucose, fructose, or mixtures thereof as reducing sugar.

7. A parenteral nutrient composition made by the process of (A) sterilizing a sugar solution comprising from about 2.5 to about 70% of a reducing sugar and from about 0.05 to about 5 g/l of N-acetyl cysteine and no other amino acids;

(B) sterilizing an amino acid solution; and (C) admixing said sterilized solutions to form a colorless nutrient composition.

8. A composition according to claim 7 wherein the sugar solution comprises less than or equal to 1 g/l of N-acetyl cysteine.

9. A composition according to claim 7 wherein the reducing sugar is selected from the group consisting of glucose, fructose, and mixtures thereof.

10. A method for preventing discoloration in a parenteral nutrient composition containing nutritional amounts of carbohydrates and amino acids comprising formulating said composition by admixing (1) a solution containing from about 2.5 to about 70% of a reducing sugar and from about 0.01 to about 50 g/l of N-acetyl cysteine and no other amino acids with (2) an amino acid solution.

11. A method according to claim 10 wherein the sugar solution comprises from about 0.05 to about 5 g/l of N-acetyl cysteine.

12. A method according to claim 11 wherein the sugar solution comprises less than or equal to about 1 g/l N-acetyl cysteine.

13. A method according to claim 10 wherein the reducing sugar is selected from the group consisting of glucose, fructose, and mixtures thereof.

* * * * *